Feb. 27, 1940.　　　P. NOWAK ET AL　　　2,191,581
INSULATING RESINOUS COMPOSITIONS AND ELECTRICAL
CONDUCTORS COATED WITH THE SAME
Filed June 14, 1939

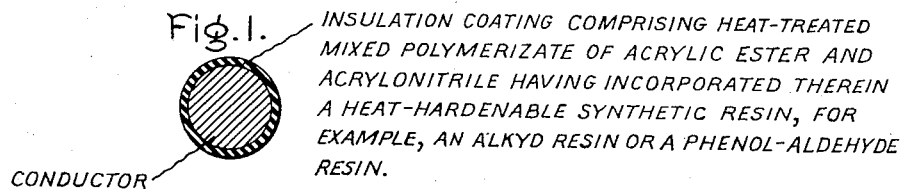

Fig.1.
CONDUCTOR

INSULATION COATING COMPRISING HEAT-TREATED MIXED POLYMERIZATE OF ACRYLIC ESTER AND ACRYLONITRILE HAVING INCORPORATED THEREIN A HEAT-HARDENABLE SYNTHETIC RESIN, FOR EXAMPLE, AN ALKYD RESIN OR A PHENOL-ALDEHYDE RESIN.

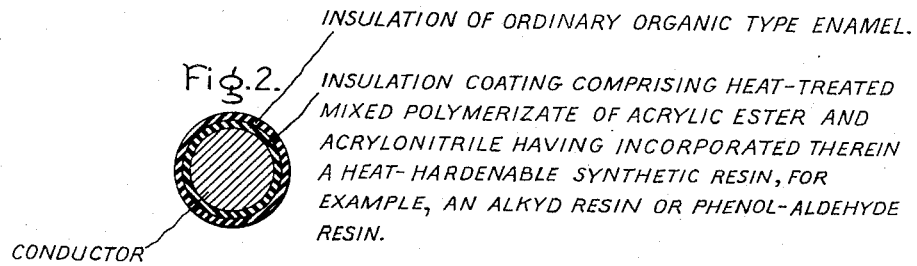

Fig.2.
CONDUCTOR

INSULATION OF ORDINARY ORGANIC TYPE ENAMEL.

INSULATION COATING COMPRISING HEAT-TREATED MIXED POLYMERIZATE OF ACRYLIC ESTER AND ACRYLONITRILE HAVING INCORPORATED THEREIN A HEAT-HARDENABLE SYNTHETIC RESIN, FOR EXAMPLE, AN ALKYD RESIN OR PHENOL-ALDEHYDE RESIN.

Inventors:
Paul Nowak,
Telemach Triantaphyllides,
by　Harry E. Dunham
Their Attorney.

Patented Feb. 27, 1940

2,191,581

UNITED STATES PATENT OFFICE 2,191,581

INSULATING RESINOUS COMPOSITIONS AND ELECTRICAL CONDUCTORS COATED WITH THE SAME

Paul Nowak and Telemach Triantaphyllides, Berlin-Charlottenburg, Germany, assignors to General Electric Company, a corporation of New York Application June 14, 1939, Serial No. 279,202
In Germany June 18, 1938

5 Claims. (Cl. 174—125)

The present invention relates broadly to coating compositions and to articles coated therewith. It is concerned more particularly with the production of liquid coating compositions of the kind known to the trade as "wire enamels" and to electrical conductors, for example a copper wire, insulated with the same. The liquid coating compositions of this invention comprise a volatile solvent and a resinous material consisting of suitably combined polymerized acrylic ester, polymerized acrylonitrile and potentially reactive (heat-hardenable) synthetic resin, as for example a phenol-aldehyde resin or an alkyd resin.

For some time it has been attempted to an increasing extent to use synthetic resins instead of oleo-resinous coating compositions for insulating purposes in the electrical industry, for instance in the manufacture of varnished or enameled wires. This growing tendency is due in part to the fact that the oleo-resinous varnishes are not entirely resistant to mineral oil and mineral oil-containing materials, and since it is now known that many varnishes comprising synthetic resins are more resistant to oils and impregnating compounds that contain oil (such as mineral oil-resin compounds) than are the oleo-resinous varnishes.

Many different derivatives of acrylic acid are among the numerous highly polymerized compounds which frequently have been used in making liquid coating compositions. It has been found, however, that compositions of the polyacrylic acid type have poor heat and moisture resistance and that their dielectric properties are inadequate for many purposes.

In the co-pending application of Georg Pohler, Serial No. 159,974, filed August 19, 1937, and assigned to the same assignee as the present invention, a method is disclosed and claimed for improving the physical and electrical properties of varnishes, enamels and the like comprising polymerized acrylic compounds. In accordance with the invention therein described the solid base material of the varnish or the applied solvent-free varnish film is heated to the point of incipient decomposition, that is to a point at, or closely approaching, the beginning of its dissociation. The material, however, is not heated to a point at which substantial decomposition or dissociation occurs. The invention makes possible the production of an improved insulated electrical conductor wherein the insulation comprises a polymerized acrylic compound that is highly resistant to heat, oil, moisture, solvents and various chemicals, and has flexibility and insulation resistance of a high order.

In the co-pending application of Paul Nowak, Hermann Hofmeier and Carlos Tobis, Serial No. 159,972, filed August 19, 1937, and assigned to the same assignee as the present invention, there is disclosed and claimed an insulated electrical conductor wherein the insulation comprises the residue of heating to incipient decomposition a mixture of polymerized ester of acrylic acid and polymerized acrylonitrile. The applicants found that when polymerized acrylonitrile is present in a varnish which also contains a polymerized ester of acrylic acid, the composition may be heated to incipient decomposition of the basic materials without lowering the insulating properties of the dried coating as a result of the presence therein of objectionable dissociation products. The hardened coating is practically free from such dissociation products.

The present invention is concerned with certain improvements and modifications in the processes and products disclosed and claimed in the above-identified co-pending applications, especially co-pending application Serial No. 159,972—Nowak et al.

It is an object of this invention to provide a liquid coating composition comprising a modified mixed polymerizate of acrylic ester and acrylonitrile, which composition, for the same base or solid content, has a lower viscosity than a liquid coating composition comprising acrylic ester-acrylonitrile mixed polymerizate in unmodified form. Otherwise expressed, the invention provides a liquid coating composition containing modified acrylic ester-acrylonitrile mixed polymerizate which, when the viscosities are the same, has a higher base or solid content than the unmodified mixed polymerizate. This is a distinct advantage, since it makes possible the coating of a wire to a desired thickness, using conventional wire-coating apparatus, with a lesser number of passes of the wire through the apparatus than previously was possible. Further, less solvent is required, since higher concentrations of base to solvent may be employed. Solvent losses therefore are less.

Another object of the invention is to provide articles of manufacture comprising a base member, specifically a metallic conducting core such, for example, as plain or tinned copper wire, having a superposed adhering layer of an insulating coating of increased resistance to flow under heat and pressure as compared with an insulating coating formed of acrylic ester-acrylonitrile mixed polymerizate. This insulating coating also is highly resistant to oil, moisture, solvents and various chemicals, is flexible and has electrically insulating values of the order of those described in the afore-mentioned co-pending applications.

The above objects are attained in accordance with the present invention by suitably incorporating a heat-hardenable synthetic resin into a mixed polymerizate of acrylic ester and acrylonitrile, for example by dissolving the components in a common solvent to form a varnish. This varnish is applied to articles such as wires. The coated article is heated sufficiently to effect incipient decomposition of the coating as hereafter more fully described.

The novel features of our invention are set forth in the appended claims. The invention itself, however, will be understood most readily from the following description when considered in connection with the accompanying drawing in which:

Fig. 1 is a cross-sectional view of an electrical conductor provided with insulation in accordance with the invention; and Fig. 2 also is a cross-sectional view showing a conductor provided with a coating of the new insulating material directly upon the conductor and superimposed on this first coating a second coating formed of ordinary organic type enamel.

The acrylic component of the new compositions may comprise a mixture of polymerized acrylic ester and polymerized acrylonitrile or it may be a mixed polymerizate resulting from the conjoint polymerization of monomeric acrylic ester and monomeric acrylonitrile. Varnishes may be made from the monomeric or polymeric acrylic compounds. Any suitable ester of acrylic acid may be employed, for example the methyl ester, ethyl ester, propyl ester, butyl ester, etc., or mixtures of such esters. We prefer to use the ethyl ester.

The properties of the insulating film may be considerably varied by varying the proportions of the components of the varnish base. For example, the hardness, elasticity and softening point of the dried film may be altered not only by varying the amount of heat-hardenable resin incorporated into the composition but also by varying the ratio of acrylic ester to acrylonitrile and by controlling the degree of polymerization of the acrylic components. Generally the acrylonitrile constitutes, by weight, at least 10 per cent and not more than about 65 per cent of the total acrylic components. Best results have been obtained using polymerized ethyl ester of acrylic acid and polymerized acrylonitrile in the ratio of from 2 to 3 parts by weight of the former to 1 part by weight of the latter. The ratios mentioned refer to the components in monomeric, or in partially or completely polymerized state, that is, in whatever their particular state may be when made into a varnish composition.

The amount of heat-hardenable synthetic resin incorporated into the acrylic compound may be varied considerably, depending upon the particular synthetic resin and acrylic compound employed and the particular properties desired in the end-product. In the production of wire or baking enamels, we ordinarily employ from 10 per cent to not exceeding substantially 50 per cent by weight of the whole of heat-hardenable synthetic resin, the remainder of the varnish base being the above-described mixed polymerizate of acrylic ester and acrylonitrile. Especially satisfactory results have been obtained by using the heat-hardenable synthetic resin and the acrylic compound in approximately equal parts by weight. No particular advantage accrues from the use of less than 10 per cent by weight of synthetic resin in the varnish base.

The heat-hardenable synthetic resin may be an alkyd resin, which are resinous complexes obtained by effecting reaction between a polyhydric alcohol and a polybasic acid. The polyhydric alcohol may be, for example, ethylene glycol, diethylene glycol, propylene glycol, butylene glycol, glycerol, pentaerythritol, etc., or mixtures of such alcohols. The polybasic acid may be, for instance, acids such as phthalic, succinic, glutaric, adipic, pimelic, suberic, sebacic, maleic, citric, etc. The properties of the alkyd resin may be altered by incorporating therein other modifying agents, as for example monobasic acids.

Particularly satisfactory results have been obtained by using an alkyd resin made with organic hydroxy acids, more particularly hydroxy carboxylic acids such as glycollic, lactic, glyceric, tartronic, malic, tartaric, citric, etc. For example, a polyhydric alcohol such as glycerol or ethylene glycol is esterified with a hydroxy acid, preferably citric acid, to yield a product having free alcoholic hydroxyl groups, which groups are then esterified with an aromatic or aliphatic polybasic acid such as phthalic, succinic, adipic, etc.

Another type of alkyd resin which may be employed is a product obtained by esterifying a hydroxy acid, preferably citric acid, with a polyhydric alcohol, preferably ethylene glycol, to yield an ester with an acid number of the order of 5 to 10. Additional citric acid, for instance the same amount used in the preparation of the glycol citrate, is dissolved in the said ester. The mass is heated at a suitable temperature, for instance at 140° to 160° C. while agitating by mechanically stirring or by passing an inert gas therethrough (e. g., carbon dioxide, etc.), until the reaction product has an acid number of approximately 130 to 135. This product is flowable while hot but forms at room temperature a slightly yellow, solid resinous mass, which is soluble in water, acetone and mixtures of acetone and alcohol. It can be converted to the insoluble infusible state by prolonged heating at 125° to 160° C. Preferably, however, a small amount of an accelerator of hardening (for instance from about 3 to 5 per cent by weight of formaldehyde or a compound engendering formaldehyde, such as paraformaldehyde or hexamethylene tetramine) is incorporated into the soluble reaction product. Generally, the addition of about 4 per cent paraformaldehyde will cause the resinous mass to convert to the insoluble infusible state in approximately 4 minutes at 125° to 160 C.

By using alkyd resins made with hydroxy acids certain advantages accrue. For example, the end-products (baked coatings) show improved electrical properties, better resistance to flow under heat and pressure and better adhesive characteristics, particularly toward metals such as aluminum, as compared with some of the alkyd resins.

Other heat-hardenable resins compatible with the mixed acrylic ester-acrylonitrile polymerizate may be employed, for instance compatible aldehydic resins such as phenol-aldehyde resins, urea-aldehyde resins, aniline-aldehyde resins, etc. A cresol-formaldehyde resin is especially suitable, yielding improvements in adhesion, resistance to flow under heat and pressure, solvent resistance.

dielectric strength and in other properties as compared with the unmodified material.

As a result of the high resistance to solvents of the acrylic compounds used in practicing the present invention, and particularly because of the acrylonitrile component, the selection of a suitable solvent or solvent mixture for making the wire enamel causes considerable difficulties. In the case of conventional oil varnishes this problem is not encountered, since such varnishes readily may be dissolved in common solvents such as benzene, petroleum naphthas and the like.

Furthermore, when applying a baking enamel containing a mixed polymerizate of acrylic ester and acrylonitrile to a wire by means of conventional wire enameling apparatus, best results are obtained only when a solvent is used that boils over a wider range than do the conventional varnish solvents, which usually are single chemical substances or substances of such composition that they volatilize within a narrow temperature range. While various solvent mixtures may be employed in carrying the present invention into effect, a preferred solvent composition is a mixture comprising butanone, butanol, cyclohexanone, dichlordiethyl ether, butyl acetate and glycol diacetate. A more specific example of such a solvent follows:

| | Per cent by weight |
|---|---|
| Butanone (methyl ethyl ketone) | 6.0 |
| Butanol | 8.0 |
| Cyclohexanone | 38.0 |
| Dichlordiethyl ether | 12.5 |
| Butyl acetate | 29.0 |
| Glycol diacetate | 6.5 |

The stated percentage proportions are not limited thereto but may be varied with variations in, for example, the selected polymerized acrylic ester or mixture of esters, the ratio of the polymerized acrylonitrile to such ester or esters, and the particular heat-hardenable resin employed and the ratio of the same to the acrylic compounds.

The concentration of the varnish base (heat-hardenable synthetic resin plus the above-described mixed polymerizate) in the solvent also may be varied depending, for example, upon the particular coating application and the means employed in applying the coating. For instance, in certain cases the coating composition may contain as little as 5 per cent by weight of varnish base while in other cases the varnish base may constitute from 25 to 30 per cent, or more, by weight of the liquid coating composition. For most wire-enameling applications the base content of the enamel generally is of the order of approximately 10 to 20 per cent by weight of the enamel.

Enameled wires are produced by drawing the clean wire, for example clean copper or aluminum wire, through a bath of the wire enamel produced as above described. The coated wire is subjected to heat, for instance by introducing it into a suitable oven or chamber wherein the enamel coating is baked at an elevated temperature. More specifically, the coated wire is heated to a temperature and for a period of time sufficient to evaporate the solvent and to leave a substantially solvent-free adhering coating to the wire. The thus coated wire is heated further to the point of incipient decomposition of the applied coating but not materially thereabove. During this heating or baking treatment, which involves bringing the coated wire to temperatures of the order of 300° to 400° C. for a short time, melting or fusion of the acrylic components takes place simultaneously with the advancement of the modifying resin to the insoluble infusible state. This insulating coating properly may be described as the residue of heating to incipient decomposition (but not materially thereabove) a mixed polymerizate of acrylic ester and acrylonitrile having incorporated therein a heat-hardenable synthetic resin. The coating is homogeneous, tough, flexible, hard, substantially non-porous and of high dielectric strength. It has a high resistance to solvents and increased resistance to flow under heat and pressure as compared with an insulating coating formed exclusively of acrylic ester-acrylonitrile mixed polymerizate.

In a particular instance a wire enamel was formed by dissolving in a solvent a mixture of equal parts by weight of a heat-hardenable phenol-formaldehyde resin and a mixed polymerizate of acrylic ester and acrylonitrile composed, by weight, of approximately 30 per cent polymerized acrylonitrile and 70 per cent polymerized acrylic ester. The solvent comprised the same components in approximately the same proportions as set forth in the specific example of a suitable solvent above described. A wire 3 millimeters in diameter was coated with this composition and heated in the manner above set forth. The insulating film was 0.02 millimeters thick. The breakdown voltage at 20° C. of the coated wire was 2440 volts. After winding on a mandrel 10 millimeters diameter the wire showed a breakdown voltage of 1900 volts at 20° C. A sample of the coated wire, after being exposed for 4 days to a temperature of approximately 150° C. and wound on a mandrel 10 millimeters diameter, showed a breakdown voltage of 1800 volts at 20° C. These tests are indicative of the high dielectric strength, flexibility and heat resistance of the new insulating coating.

It is to be understood, of course, that this invention is not limited to the production of enameled conductors wherein the insulating enamel consists solely, as shown in Fig. 1, of the herein-described incipient decomposition product. For example, a conductor may be provided first with a coating of the new insulating material, followed by one or more coatings of an ordinary organic type enamel, for example an oil enamel, as shown in Fig. 2. When this practice is followed, the initially applied coating should be baked to effect incipient decomposition and to render the coating so resistant to the solvents in the oil enamel that the latter coating will not attack the first coating. This procedure for insulating a conductor advantageously may be followed for communication wire applications where lower dielectric losses and higher insulation resistances particularly are desired. In other cases a coating or coatings of ordinary organic enamel advantageously may be interposed between a plurality of coatings of the new insulating material.

Although the preferred embodiment of the invention comprises heating the enameled wire or other coated article to effect incipient decomposition of the coating and thus to obtain the above-described improvement in properties, other methods also may be employed. For example, in certain cases the mixed acrylic ester-acrylonitrile polymerizate having incorporated therein a heat-hardenable synthetic resin may be heated to incipient decomposition prior to being placed in the position of its ultimate use. Thus, a flexible alkyd or other suitable heat-hardenable resin may be incorporated with the acrylic compound, the resulting mass made into sheets or other suitable form and the shaped mass heated to incipient decomposition as above set forth. Tapes of such material, alone or adhesively held to a suitable backing member such as cloth, may be applied as insulation to conductors, for instance by the strip-covering method.

In other cases we may heat the mixed polymerizate to incipient decomposition and thereafter incorporate the heat-treated polymerizate with the heat-hardenable resin. For example, the heat-treated polymerizate may be dissolved in a suitable solvent and a soluble heat-hardenable resin mixed therewith. The resulting varnish may be applied to a base member, for example a copper or aluminum wire, and the coated article heated to a temperature sufficient to evaporate the solvent and convert the heat-hardenable resin to the insoluble, infusible state.

What we claim as new and desire to secure by Letters Patent of the United States is:

1. A resinous insulation composed of the residue of heating to incipient decomposition, but not materially thereabove, a mixture containing polymerized acrylic ester, polymerized acrylonitrile and heat-hardenable synthetic resin.

2. An insulated electrical conductor wherein the insulation comprises the residue of heating to incipient decomposition, but not materially thereabove, a mixture containing polymerized acrylic ester, polymerized acrylonitrile and heat-hardenable synthetic resin.

3. An insulated electrical conductor comprising a metallic conductor and insulation therefor comprising the residue of heating to incipient decomposition, but not materially thereabove, a mixture containing polymerized ethyl ester of acrylic acid, polymerized acrylonitrile and heat-hardenable synthetic resin, said resin being present in an amount not exceeding substantially 50 per cent by weight of the said mixture.

4. An electrical conductor insulated with a covering comprising the residue of heating to incipient decomposition, but not materially thereabove, a mixture containing polymerized acrylonitrile, polymerized ethyl ester of acrylic acid and a heat-hardenable cresolformaldehyde resin, said resin being present in an amount not exceeding substantially 50 percent by weight of the said mixture.

5. An insulated electrical conductor comprising a metallic conducting core and a layer of insulation superposed thereon, said layer comprising the residue of heating to incipient decomposition, but not materially thereabove a mixture containing, by weight, from 2 to 3 parts polymerized ethyl ester of acrylic acid to 1 part polymerized acrylonitrile and, in addition, a heat-hardenable reaction product of a polyhydric alcohol with a hydroxy carboxylic acid, said reaction product being present in an amount not exceeding substantially 50 per cent by weight of the said mixture.

PAUL NOWAK.
TELEMACH TRIANTAPHYLLIDES.